United States Patent

Reifschneider

[15] 3,674,857

[45] July 4, 1972

[54] (((ALKYLTHIO)ALKYL)THIO)PHENOLS

[72] Inventor: Walter Reifschneider, Midland, Mich.

[73] Assignee: The Dow Chemical Company, Midland, Mich.

[22] Filed: March 2, 1970

[21] Appl. No.: 15,845

[52] U.S. Cl. ............260/609 F, 260/465 D, 260/465 F, 260/470, 260/516, 424/304, 424/308, 424/317, 424/335
[51] Int. Cl. ...........................................C07c 149/36
[58] Field of Search .............................260/609 F

[56] References Cited

UNITED STATES PATENTS 3,304,225  2/1967  Szabo et al. ...........................424/300

*Primary Examiner*—Joseph Rebold
*Assistant Examiner*—D. R. Phillips
*Attorney*—Griswold & Burdick, Theodore Post and John L. Spalding

[57] ABSTRACT

Novel (((alkylthio)alkyl)thio)phenols corresponding to the formula

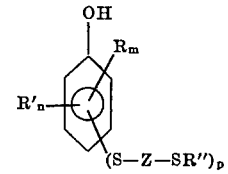

wherein R represents a lower alkyl, lower alkoxy, fluoro, chloro, bromo or iodo group; R' represents an R or a cyclopentyl, cyclohexyl, phenyl, naphthyl, nitro, hydroxy, carboxy, carbalkoxy, trifluoromethyl or cyano group; $m$ represents an integer fro 0 to 3; $n$ represents an integer fro 0 to 2; Z represents a one to four carbon straight-chain or branched-chain alkylene group; R'' represents a lower alkyl, lower haloalkyl, lower alkenyl, or lower alkynyl group; $p$ represents an integer from 1 to 2 and the sum of $m+n+p$ is an integer from 1 to 5. The terms "lower alkyl," "lower haloalkyl" and "lower alkoxy" represent groups containing from one to four carbon atoms. The terms "lower alkenyl" and "lower alkynyl" represent groups containing from two to four carbon atoms. The compounds are useful as pesticides.

10 Claims, No Drawings

(((ALKYLTHIO) ALKYL)THIO)PHENOLS

SUMMARY OF THE INVENTION

This invention concerns the new compounds represented by the formula

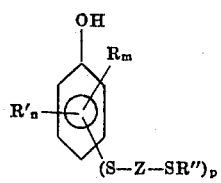

wherein R represents a lower alkyl, lower alkoxy, fluoro, chloro, bromo or iodo group; R' represents an R or a cyclopentyl, cyclohexyl, phenyl, naphthyl, nitro, carboxy, carbalkoxy, trifluoromethyl, cyano or hydroxy group; $m$ represents an integer from 0 to 3; $n$ represents an integer from 0 to 2; Z represents a one to four carbon straight-chain or branched-chain alkylene group; R" represents a lower alkyl, lower haloalkyl, lower alkenyl, or lower alkynyl group; $p$ represents an integer from 1 to 2 and the sum of $m+n+p$ is an integer from 1 to 5. The terms "lower alkyl," "lower haloalkyl" and "lower alkoxy" represent groups containing from one to four carbon atoms. The terms "lower alkenyl" and "lower alkynyl" represent groups containing from two to four carbon atoms.

The compounds are crystalline solids or oils which are soluble in common organic solvents such as, for example, acetone and benzene and slightly soluble in water. They are useful as pesticides for the control of a wide variety of plants including bacterial plants and fungi.

Representative compounds of the present invention include 4-((2-(methylthio)ethyl)thio)-3,5-xylenol, 4-((2-(methylthio)ethyl)thio)-m-cresol, 2-chloro-4-(((methylthio)methyl)thio)phenol, p-(((methylthio)methyl)thio)phenol, 4-(((methylthio)methyl)thio)-o-cresol, p-((2-(methylthio)ethyl)thio)phenol, 2-chloro-4-((2-(methylthio)ethyl)thio)phenol, 2-chloro-5-methyl-4-((2-(methylthio)ethyl)thio)phenol, 4-(((methylthio)methyl)thio)-m-cresol, o-((2-(methylthio)ethyl)thio)phenol, 5-t-butyl-2-((2-(methylthio)ethyl)thio)phenol, 2-cyclohexyl-4-((2-(methylthio)ethyl)thio)phenol, 2,6-di-t-butyl-4-((2-(methylthio)ethyl)thio)phenol, 4-((2-(methylthio)ethyl)thio)-2,3,6-trichlorophenol, 4-((2-(ethylthio)ethyl)thio)-2,3,5,6-tetrachlorophenol, 2-methoxy-4-((2-(t-butylthio)-ethyl)thio)phenol, 4-((2-(t-butylthio)ethyl)thio)-2-phenylphenol, 4-((2-(t-butylthio)ethyl)thio)-3,5-xylenol, 4-((3-(methylthio)propyl)thio)-3,5-xylenol, p-((3-(ethylthio)-propyl)thio)phenol, 2,6-dichloro-4-((2-chloro-3-(ethylthio)-propyl)thio)phenol and 3-trifluoromethyl-4-((2-(methylthio)-ethyl)thio)phenol.

The (((alkylthio)alkyl)thio)phenols of the present invention are prepared by reacting an alkali metal or ammonium salt of a mercaptophenol and an (alkylthio)alkyl halide according to the following equation wherein R, R', $m$, $n$, Z, R" and $p$ have the significance previously given, M is alkali metal or ammonium, and X is chloro-, bromo-, or iodo:

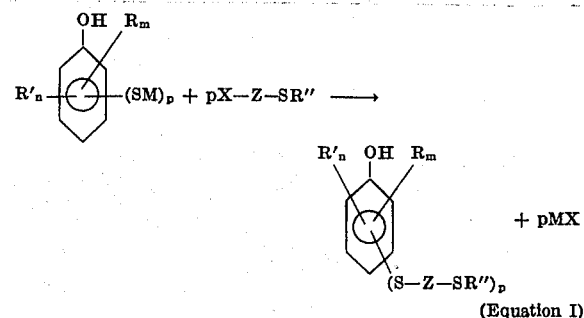

(Equation I)

The reaction involves molar equivalents of the mercaptide salt moiety and the halide in a typical alkylation reaction. The reaction is conveniently carried out in an inert solvent as reaction medium, such as, organic liquids, for example, methanol, ethanol, isopropanol or, in some instances, water (water is not recommended in the case of alkylating agents which react with water, for example, monochlorodimethyl sulfide). The amounts of the reagents to be employed are not critical, some of the desired products being obtained when employing any proportions of the reactants. However, the reaction consumes the reactants in stoichiometric proportions, i.e., one equivalent of mercaptide per equivalent of halide, and maximum yields are obtained when about stoichiometric proportions of the reactants are used. The mercaptide salt advantageously is formed in situ by the addition of a base in at least a stoichiometric proportion based on the corresponding mercaptide. Appropriate bases include alkali metal hydroxides, alkali metal alkoxides, alkali metal carbonates, strong amines, strongly basic quaternary ammonium hydroxides, and the like. Alkylation proceeds at a halide salt liberating temperature, conveniently at a temperature of from 0° to 100° C. and preferably at a temperature between 10° and 60° C.

In carrying out the reaction, the reactants are mixed and contacted together in any convenient fashion and the resulting mixture maintained in the reaction temperature range for an appropriate period of time. The reaction time and the reaction temperature depend upon the reactivity of the halide reactant. With a very reactive halide reactant, room temperature and a reaction time of several minutes suffices. With less reactive halide reactants, higher temperatures and longer reaction times are required. The progress of the reaction can be followed by liberation of by-product halide salt.

Alternatively, the compounds of the present invention can also be prepared by reacting a thiocyanophenol and an (alkylthio)alkyl halide in the presence of a base according to the following equation wherein reactants and product are indicated, and wherein R, R', $m$, $n$, Z, R", $p$ and X have the significance previously given:

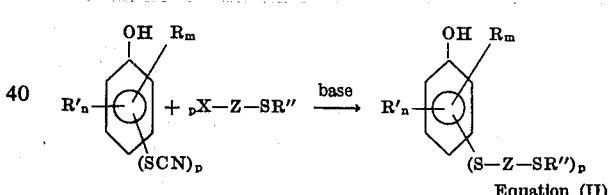

Equation (II)

The conditions for the conversion of thiocyanophenols into the (((alkylthio)alkyl)thio)phenols are substantially identical with the conditions described in U.S. Pat. No. 3,303,209, patented Feb. 7, 1967, for the preparation of phenol thioethers from the corresponding thiocyanates and alkylating agents, for example, alkyl chlorides.

Following the reaction, the reaction mixture is processed by conventional procedures to obtain the desired (((alkylthio)alkyl)thio)phenol product. In one such conventional procedure, the reaction medium is distilled to separate any volatile materials from the desired product. The product can then be employed in pesticidal applications as such or further purified by such conventional procedures as washing, recrystallization or distillation.

DESCRIPTION OF SOME PREFERRED EMBODIMENTS

The following examples describe representative specific embodiments and the best modes contemplated by the inventor for carrying out the invention, but are not to be considered as limiting thereof. Temperatures are given in centigrade degrees, absolute pressure in mm. Hg and refractive index, RI, at 25° C. with the D line of sodium as light source.

EXAMPLE 1: 4-((2-(METHYLTHIO)ETHYL)THIO)-3,5-XYLENOL

To a sodium methoxide solution, prepared from 310 ml. of methanol and 11.96 g. of sodium is added 80 g. of 4-mercapto-3,5-xylenol. To the resulting solution 57.5 g. of 2-chloroethyl methyl sulfide is then added dropwise. After the addition is completed, the mixture is stirred and heated under reflux for 3 hours. The methanol is then removed by distillation under vacuum and the residue is taken up in methylene chloride. The methylene chloride solution is washed with water to remove the by-product sodium chloride and is then dried over anhydrous sodium sulfate. The solvent is removed by distillation under vacuum and the solid residue recrystallized from a petroleum naphtha having a boiling range of 60°–70°. Pinkish-white crystals, m.p. 71.5°–73.5° are recovered which, upon analysis, have a carbon and hydrogen content of 58.2 and 6.82 weight percent, respectively, as compared with calculated values of 57.9 and 7.06 percent, respectively, for the titled compound.

EXAMPLE 2: 4-((2-(METHYLTHIO)ETHYL)THIO)-M-CRESOL

A mixture of 82.6 g. of 4-thiocyano-m-cresol, 55 g. of 2-chloroethyl methyl sulfide and 300 ml. of methanol is stirred, cooled in an ice bath and over a period of about 15 minutes a solution of 100 g. of 85 percent pure potassium hydroxide in 150 ml. of water is added thereto. The resulting mixture is stirred at room temperature for about 1 hour, heated under reflux for 1 hour and then concentrated in vacuum. The residue is dissolved in water, the resulting turbid solution is extracted twice with ethyl ether and is then acidified with hydrochloric acid. An oil separates and is extracted into methylene chloride. The methylene chloride solution is dried over sodium sulfate, the solvent removed by evaporation and the residual oil distilled under vacuum to give an amber colored oil, b.p. 162°–167°/1.0 mm., RI = 1.6144. The product analysis (weight percent) is as follows:

Calc'd:    C, 56.0;    H, 6.58;    S, 29.9.
Found:    C, 56.0;    H, 6.54;    S, 29.8.

EXAMPLE 3: 2-CHLORO-4-(((METHYLTHIO)METHYL)THIO)-PHENOL

To a sodium methoxide solution, prepared from 298 ml. of methanol and 11.5 g. of sodium, is added dropwise 80.3 g. of 2-chloro-4-mercaptophenol followed by 48.3 g. of monochlorodimethyl sulfide. After the addition is completed, the mixture is stirred and heated under reflux overnight. The methanol is then removed by distillation under vacuum and the residue is taken up in methylene chloride. The methylene chloride solution is washed with water to remove the sodium chloride and is then dried over anhydrous sodium sulfate. The methylene chloride is then removed by evaporation under reduced pressure, and the residual oil is distilled in vacuum. The desired compound distills between 122°–138°/0.5-1.0 mm. with the main fraction distilling from 127°–130°/0.5-0.6 mm. The distillate crystallizes and is recrystallized from methylcyclohexane to give white crystals, m.p. 49.5°–50.5°. The product analysis (weight percent) is as follows:

Calc'd:    C, 43.5;    H, 6.58; S, 29.9.
Found:    C, 43.7;    H, 6.54; S, 29.8.

EXAMPLE 4: 4-((3-(METHYLTHIO)PROPYL)THIO)-3,5-XYLENOL

A solution of 7.2 g. of sodium hydroxide in 50 ml. of /0.4 is added dropwise to a mixture containing 15 g. (0.06 mole) of 4-(3-thiocyanopropylthio)-3,5-xylenol, 8.5 g. of methyl iodide and 150 ml. of methanol. After the addition is complete, the reaction mixture is heated under reflux for one hour and then the methanol is removed by evaporation. The residual material is taken up in 200 ml. of water and the resulting mixture is brought to pH 3 with concentrated hydrochloric acid, and is then extracted with three 75 ml. portions of benzene. The benzene extracts are combined and washed once with 100 ml. of water and once with 100 ml. of saturated sodium chloride solution, and dried over anhydrous sodium sulfate. The benzene is removed by evaporation and distillation of the residual oil under reduced pressure to yield a yellow oil, b.p. 120°–126°10.4 mm.; RI = 1.590.

Analysis:    Calc'd:    C, 59.5%;    H, 7.48%.
             Found:    C, 59.8%;    H, 7.51%.

EXAMPLE 5: 4-((3-ETHYL(THIO)PROPYL)THIO)-3,5-XYLENOL

A mixture containing 9.2 g. (0.04 mole) of 4-(3-chloropropylthio)-3,5-xylenol, 4.2 g. (0.05 mole) of ethanethiol sodium salt (prepared in situ from sodium ethoxide and ethanethiol) and 50 ml. of ethanol is heated under reflux for 16 hours. After the ethanol is removed by evaporation, the residue is taken up in 100 ml. of water. The aqueous mixture is extracted with three 75 ml. portions of benzene and the benzene extracts are combined and dried over anhydrous sodium sulfate. The benzene is removed by evaporation and distillation of the residual oil under reduced pressure yields 7.5 g. of yellow oil, b.p. 168°–165°/0.8-0.6 mm.

Analysis:    Calc'd:    C, 60.9%;    H, 7.86%;    S, 25.0%
             Found:    C, 61.1%;    H, 8.19%;    S, 25.2%

EXAMPLE 6: 2,6-DICHLORO-4-((2-CHLORO-3-(METHYLTHIO)PROPYL)THIO)PHENOL

A cold solution containing 16.5 g. (0.2 mole) of methylsulfenyl chloride (prepared in situ from methyl disulfide and chlorine) and 13 ml. of chloroform is added dropwise over 45 minutes to a solution of 47 g. (0.2 mole) of 4-allythio-2,6-dichlorophenol in 200 ml. of chloroform. During the addition the reaction temperature is kept at minus 20° with a Dry Ice-acetone bath. The reaction mixture is allowed to gradually warm to room temperature and the chloroform is then removed by evaporation. The residual oil (72.8 g.) is taken up in 150 ml. of chloroform and placed on a chromatography column packed with Florisil packing. The material is developed with additional chloroform. The center cuts are combined and the chloroform is removed by evaporation.

Elemental analysis
gave:    Calc'd:    C, 37.8%;    H, 3.49%
        Found:    C, 38.1%;    H, 3,48%

The NMR analysis of the residual oil (62 g., RI = 1.6,292) indicates that the major component (>90 percent) has the titular structure named for this Example and the minor component (<10 percent) has the structure:

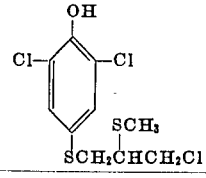

EXAMPLE 7

The following compounds are prepared in accordance with the procedure of Equation I:

a. 4-(((Methylthio)methyl)thio)-m-cresol, B.P. 150°–160°/0.8-1.0 mm., RI = 1.6,241, by reacting sodium 4-mercapto-m-cresol with monochlorodimethylsulfide.

b. o-((2-(Methylthio)ethyl)thio)phenol, B.P. 109°–111°/0.4 mm., RI = 1.6,055, by reacting sodium o-mercaptophenol with 2-chloroethyl methyl sulfide.

c. 5-t-Butyl-2-((2-(methylthio)ethyl)thio)-phenol, B.P. 135°/0.2-B—0.3 mm., RI = 1.5721, by reacting sodium 5-t-butyl-2-mercaptophenol with 2-chloroethyl methyl sulfide.

d. 2-Cyclohexyl-4-((2-(methylthio)ethyl)thio)-phenol, B.P. 193°–195°/0.8 mm., RI = 1.5,986, by reacting sodium 2-cyclohexyl-4-mercaptophenol with 2-chloroethyl methyl sulfide.

e. 2,6-di-t-Butyl-4-((2-(methylthio)ethyl)thio)-phenol, B.P. 160°–177°/0.4-0.7 mm., RI = 1,5,605, by reacting sodium 2,6- di-t-butyl-4-mercaptophenol with 2-chloroethyl methyl sulfide.

f. 2,3,6-Trichloro-4-((2-(methylthio)ethyl)thio)-phenol, melting at 74.5°–76.5°, by reacting sodium 2,3,6-trichloro-4-mercaptophenol with 2-chloroethyl methyl sulfide.

g. 2,3,5,6-Tetrachloro-4-((2-(ethylthio)ethyl)-thio)phenol, melting at 113°–114°, by reacting sodium 2,3,5,6-tetrachloro-4-mercaptophenol with 2-chloroethyl ethyl sulfide.

h. 4-((2-(t-Butylthio)ethyl)thio)guaiacol, B.P. 161°–162°/0.5 mm., RI = 1.5,745, by reacting sodium 4-mercaptoguaiacol with 2-chloroethyl t-butyl sulfide.

i. 4-((2-(t-Butylthio)ethyl)thio)-2-phenylphenol, B.P. 205°/0.7 mm., RI = 1.6,165, by reacting sodium 4-mercapto-2-phenylphenol with 2-chloroethyl t-butyl sulfide.

j. 4-((2-(t-Butylthio)ethyl)thio)-3,5-xylenol, B.P. 175°/0.5 mm., RI = 1.5,735, by reacting sodium 4-mercapto-3,5-xylenol with 2-chloroethyl t-butyl sulfide.

k. p-((3-(Ethylthio)propyl)thio)phenol, B.P. 180°–182°/1.5 mm., RI = 1.5,931, by reacting sodium p-mercaptophenol with 3-chloropropyl ethyl sulfide.

l. 4-((3-(t-Butylthio)propyl)thio)-3,5-xylenol, B.P. 172°–/2.5/0.3–0.55 mm., RI = 1.5,640, by reacting sodium 4-mercapto-3,5-xylenol with 3-chloropropyl t-butyl sulfide.

m. p-((2-(Isopropylthio)-1-methylethyl)thio)-phenol, B.P. 179°–181°12.5 mm., RI = 1.5,808, by reacting sodium p-mercaptophenol with 2-chloropropyl isopropyl sulfide.

n. 2,6-Dichloro-4-((2-(isopropylthio)-1-methylethyl)thio)phenol, B.P. 183°–184°/2.0 mm., RI = 1.5,955, by reacting sodium 2,6-dichloro-4-mercaptophenol with 2-chloropropyl isopropyl sulfide.

o. 4-((4-(Isobutylthio)butyl)thio)-m-cresol, B.P. 198°–205°/0.7 mm., RI = 1.5,651, by reacting sodium 4-mercapto-m-cresol with 4-chlorobutyl isobutyl sulfide.

p. p-(((Methylthio)methyl)thio)phenol, melting at 36°–38°, by reacting sodium p-mercaptophenol with monochlorodimethyl sulfide.

q. 4-(((Methylthio)methyl)thio)-o-cresol, B.P. 155°–159°/0.6–0.7 mm., RI = 1.6,255, by reacting sodium 4-mercapto-o-cresol with monochlorodimethyl sulfide.

r. p-((2-(Methylthio)ethyl)thio)phenol, B.P. 155°–156°/0.4 mm., RI = 1.6,215, by reacting sodium p-mercaptophenol with 2-chloroethyl methyl sulfide.

s. 2-Chloro-4-((2-(methylthio)ethyl)thio)phenol, B.P. 144°–147°/0.3 mm., RI = 1.6,260, by reacting sodium 2-chloro-4-mercaptophenol with 2-chloroethyl methyl sulfide.

t. 4-((2-(Methylthio)ethyl)thio)-o-cresol, B.P. 152°–156°/0.7 mm., RI = 1.6,133, by reacting sodium 4-mercapto-o-cresol with 2-chloroethyl methyl sulfide.

u. 4-((2-(Ethylthio)ethyl)thio)pyrocatechol, molecular weight 230.3, by reacting sodium 4-mercapto-pyrocatachol with 2-chloroethyl ethyl sulfide.

v. 2,4-Bis((2-(ethylthio)ethyl)thio)phenol, molecular weight 334.6, by reacting disodium 2,4-dimercapto-phenol with 2-chloroethyl ethyl sulfide.

EXAMPLE 8

The following compound is prepared in accordance with the procedure of Equation II:

4-((2-(Methylthio)ethyl)thio)-2-nitrophenol, molecular weight 245.3, by reacting 2-nitro-4-thiocyanophenol with 2-chloroethyl methyl sulfide in the presence of sodium hydroxide.

The (((alkylthio)alkyl)thio)phenols of this invention are useful as pesticides and antimicrobials for the control of a wide variety of fungi and bacteria such as *Pullularia pullulans*, *Candida pelliculosa*, *Trichophyton mentagrophytes*, *Aspergillus terreus*, *Bacillus subtilis*, and *Staphylococcus aureus*. This is not to suggest that the compounds claimed and compositions containing them are equally effective at similar concentrations or against the same fungal, bacterial and other plant pests. For such use, the unmodified compounds can be employed. Alternatively, the compounds can be dispersed in an edible solid to prepare animal feed compositions or on an inert finely divided solid to prepare dust compositions. The dust compositions can be dispersed in water with or without the aid of a wetting or dispersing agent, the resulting aqueous dispersions being useful as sprays. In other procedures, the compounds can be employed as a constituent in oil or solvent compositions, or with or without an emulsifying or dispersing agent in solvent-in-water or water-in-solvent emulsions or dispersions which are useful as sprays, drenches or washes.

The exact concentration of the toxic constituent to be employed in the treating compositions is not critical and may vary considerably provided an effective amount of the toxicant is supplied, whether on the plant or plant parts or in the soil, ink, adhesive, cutting oil, textile, paper, wood or other habitat or environment of the organism. Good results are obtained when employing compositions containing controlling or pesticidal concentrations and usually from about 1,000 to 10,000 parts per million by weight of one or more of the compounds. The concentration of toxicant in liquid compositions generally is from about 1 to 50 percent by weight. Concentrations up to 95 weight percent often are conveniently employed. In dusts, the concentration of the toxicant can be from about 1 to 10 weight percent. In compositions to be employed as concentrates, the toxicant can be present in a concentration of from 5 to 98 weight percent.

In representative operations, each of the compounds corresponding to the below-tabulated formulas gives complete kills and controls of the following stated organisms when employed in aqueous compositions at a concentration of 1,000 ppm by weight: *Staphylococcus aureus*, *Trichophyton mentagrophytes*, *Bacillus subtilis*, *Aspergillus terreus*, *Candida pelliculosa* and *Pullularia pullulans*.

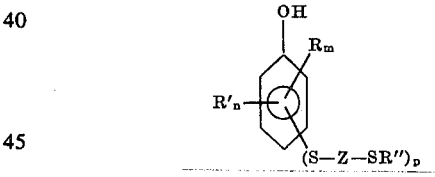

COMPOUND

| $R_m R'_n$ | $(S-Z-SR'')_p$ |
|---|---|
| 2-Cl | 4-((2-(methylthio)ethyl)thio) |
|  | 4-((2-(methylthio)ethyl)thio) |
| 2-CH₃ | 4-((2-(methylthio)ethyl)thio) |
| 3,5-di-CH₃ | 4-((2-(methylthio)ethyl)thio) |
|  | p-(((methylthio)methyl)thio) |
| 2-Cl | 4-(((methylthio)methyl)thio) |
| 3,5-di-CH₃ | 4-((3-(ethylthio)propyl)thio) |
| 5-t-butyl | 2-((2-(methylthio)ethyl)thio) |
| 2-CH₃ | 4-(((methylthio)methyl)thio) |
|  | p-((2-(methylthio)ethyl)thio) |
|  | p-((2-(isopropylthio)-1-methyl-ethyl)thio) |
| 3,5-di-CH₃ | 4((3-(methylthio)propyl)thio) |
| 2,6-di-Cl | 4((2-(isopropylthio)-1-methyl-ethyl)thio) |
| 2-cyclohexyl | 4-((2-(methylthio)ethyl)thio) |
|  | p-((3-(ethylthio)propyl)thio) |
| 3-CH₃ | 4-((4-(isobutylthio)butyl)thio) |
| 2,3,6-trichloro | 4-((2-(methylthio)ethyl)thio) |
|  | 2,4-((di-2-(ethylthio)ethyl)thio) |

Mercaptophenol starting materials are prepared in known ways, e.g., by reducing a corresponding thiocyanophenol. The (alkylthio)alkyl halides are prepared in known ways by reacting, for example, a sodium mercaptide with a halo alcohol and conversion of the intermediate (alkylthio)alkanol with thionyl chloride.

I claim:
1. A compound of the formula

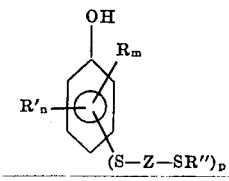

wherein R represents a lower alkyl, lower alkoxy, fluoro, chloro, bromo or iodo group; R' represents an R or a cyclopentyl, cyclohexyl, phenyl, nitro, hydroxy, or trifluoromethyl group; $m$ represents an integer from 0 to 3; $n$ represents an integer from 0 to 2; Z represents a one to four carbon straight-chain or branched-chain alkylene group; R'' represents a lower alkyl; or lower haloalkyl group; $p$ represents an integer from 1 to 2 and the sum of $m+n+p$ is an integer from 1 to 5.

2. The compound as claimed in claim 1 which is 4-((2-(methylthio)ethyl)thio)-3,5-xylenol.
3. The compound as claimed in claim 1 which is 4-((2-(methylthio)ethyl)thio)-o-cresol.
4. The compound as claimed in claim 1 which is 2-chloro-4-(((methylthio)methyl)thio)phenol.
5. The compound as claimed in claim 1 which is 4-((3-(methylthio)propyl)thio)-3,5-xylenol.
6. The compound as claimed in claim 1 which is 4-((3-(ethylthio)propyl)thio)-3,5-xylenol.
7. The compound as claimed in claim 1 which is 2,6-dichloro-4-((2-chloro-3-(methylthio)propyl)thio)phenol.
8. The compound as claimed in claim 1 which is p-(((methylthio)methyl)thio)phenol.
9. The compound as claimed in claim 1 which is 4-(((methylthio)methyl)thio)-o-cresol.
10. The compound as claimed in claim 1 which is 4-(((methylthio)methyl)thio)-m-cresol.

* * * * *

PO-1050
(5/69)

UNITED STATES PATENT OFFICE
CERTIFICATE OF CORRECTION

Patent No. 3,674,857          Dated July 4, 1972

Inventor(s) Walter Reifschneider

It is certified that error appears in the above-identified patent and that said Letters Patent are hereby corrected as shown below:

In fourth line of Abstract, strike "from from".

In ninth line of Abstract, in two instances after integer strike "fro" and insert --from--.

Column 3, line 57, strike "6.58" and insert --4.11--; strike "29.9" and insert --29.0--.

Column 3, line 58, strike "6.54" and insert --4.28--; strike "29.8" and insert --28.9--.

Column 3, line 63, strike "/0.4" and insert --water--.

Column 4, line 2, strike "10.4" and insert --/0.4--.

Column 4, line 43, strike "3,48%" and insert --3.48%--.

Column 5, line 21 and 22, strike "/2.5" and insert --187°--.

Column 5, line 25, strike "12.5" and insert --/2.5--.

Signed and sealed this 29th day of May 1973.

(SEAL)
Attest:

EDWARD M. FLETCHER, JR.        ROBERT GOTTSCHALK
Attesting Officer              Commissioner of Patents